(12) United States Patent
Chen et al.

(10) Patent No.: US 10,791,834 B2
(45) Date of Patent: Oct. 6, 2020

(54) SLIDE RAIL ASSEMBLY AND RAIL KIT THEREOF

(71) Applicants: KING SLIDE WORKS CO., LTD., Kaohsiung (TW); KING SLIDE TECHNOLOGY CO., LTD., Kaohsiung (TW)

(72) Inventors: Ken-Ching Chen, Kaohsiung (TW); Shun-Ho Yang, Kaohsiung (TW); Wei-Chen Chang, Kaohsiung (TW); Chun-Chiang Wang, Kaohsiung (TW)

(73) Assignees: King Slide Works Co., Ltd., Kaohsiung (TW); King Slide Technology Co., Ltd., Kaohsiung (TW)

(*) Notice: Subject to any disclaimer, the term of this patent is extended or adjusted under 35 U.S.C. 154(b) by 0 days.

(21) Appl. No.: 16/423,562

(22) Filed: May 28, 2019

(65) Prior Publication Data
US 2020/0214444 A1 Jul. 9, 2020

(30) Foreign Application Priority Data
Jan. 8, 2019 (TW) .............................. 108100945 A

(51) Int. Cl.
*F16C 29/00* (2006.01)
*A47B 88/473* (2017.01)
(Continued)

(52) U.S. Cl.
CPC .......... *A47B 88/473* (2017.01); *A47B 88/483* (2017.01); *A47B 88/49* (2017.01);
(Continued)

(58) Field of Classification Search
CPC ........ F16C 29/005; F16C 29/04; A47B 88/00; A47B 88/49; A47B 88/473; A47B 88/483;
(Continued)

(56) References Cited

U.S. PATENT DOCUMENTS 6,412,891 B1 7/2002 Liang et al.
6,935,710 B2 * 8/2005 Chen ...................... A47B 88/50
312/333

(Continued)

FOREIGN PATENT DOCUMENTS

CN 204273798 * 4/2015 ............. A47B 88/04
EP 3292789 A1 3/2018
EP 3488733 A1 5/2019

OTHER PUBLICATIONS

Foreign Patent Search Document Issued by a Foreign Patent Office (19183285.6-1011).

*Primary Examiner* — Marcus Charles
(74) *Attorney, Agent, or Firm* — Rosenberg, Klein & Lee

(57) ABSTRACT

A slide rail assembly includes a first rail, a second rail, a first locking mechanism, and a second locking mechanism. The second rail can be displaced with respect to the first rail. The first locking mechanism and the second locking mechanism are disposed at two different portions of the second rail respectively and can be locked to the first rail separately in order to keep the second rail at either of two predetermined extended positions. The first locking mechanism and the second locking mechanism can then be operated and thereby unlocked from the first rail so that the second rail can be retracted with respect to the first rail.

19 Claims, 10 Drawing Sheets

(51) Int. Cl.
  *A47B 88/483* (2017.01)
  *A47B 88/49* (2017.01)
  *A47B 88/50* (2017.01)

(52) U.S. Cl.
  CPC ............ *A47B 88/50* (2017.01); *F16C 29/005* (2013.01); *A47B 2210/0059* (2013.01); *A47B 2210/0081* (2013.01)

(58) Field of Classification Search
  CPC .......... A47B 88/493; A47B 2210/0059; A47B 88/50; F47B 88/50
  USPC ............ 384/21–22, 37, 40; 312/333, 334.38, 312/334.44, 334.46, 334.1
  See application file for complete search history.

(56) References Cited

U.S. PATENT DOCUMENTS

| | | | |
|---|---|---|---|
| 7,744,174 B2 * | 6/2010 | Peng .................... | A47B 88/423 |
| | | | 312/333 |
| 7,918,517 B2 * | 4/2011 | Chen ..................... | A47B 88/57 |
| | | | 312/334.46 |
| 9,848,701 B1 * | 12/2017 | Chen .................... | H05K 7/1489 |
| 9,854,909 B1 * | 1/2018 | Chiu .................... | A47B 88/487 |
| 10,499,738 B2 * | 12/2019 | Chen .................... | A47B 88/477 |
| 2003/0141791 A1 * | 7/2003 | Dubon ................. | H05K 7/1489 |
| | | | 312/333 |
| 2005/0074190 A1 * | 4/2005 | Traiser ................. | F24C 15/168 |
| | | | 384/21 |
| 2008/0197758 A1 | 8/2008 | Mushan et al. | |
| 2009/0096340 A1 | 4/2009 | Chen et al. | |
| 2013/0259411 A1 | 10/2013 | Judge | |

* cited by examiner

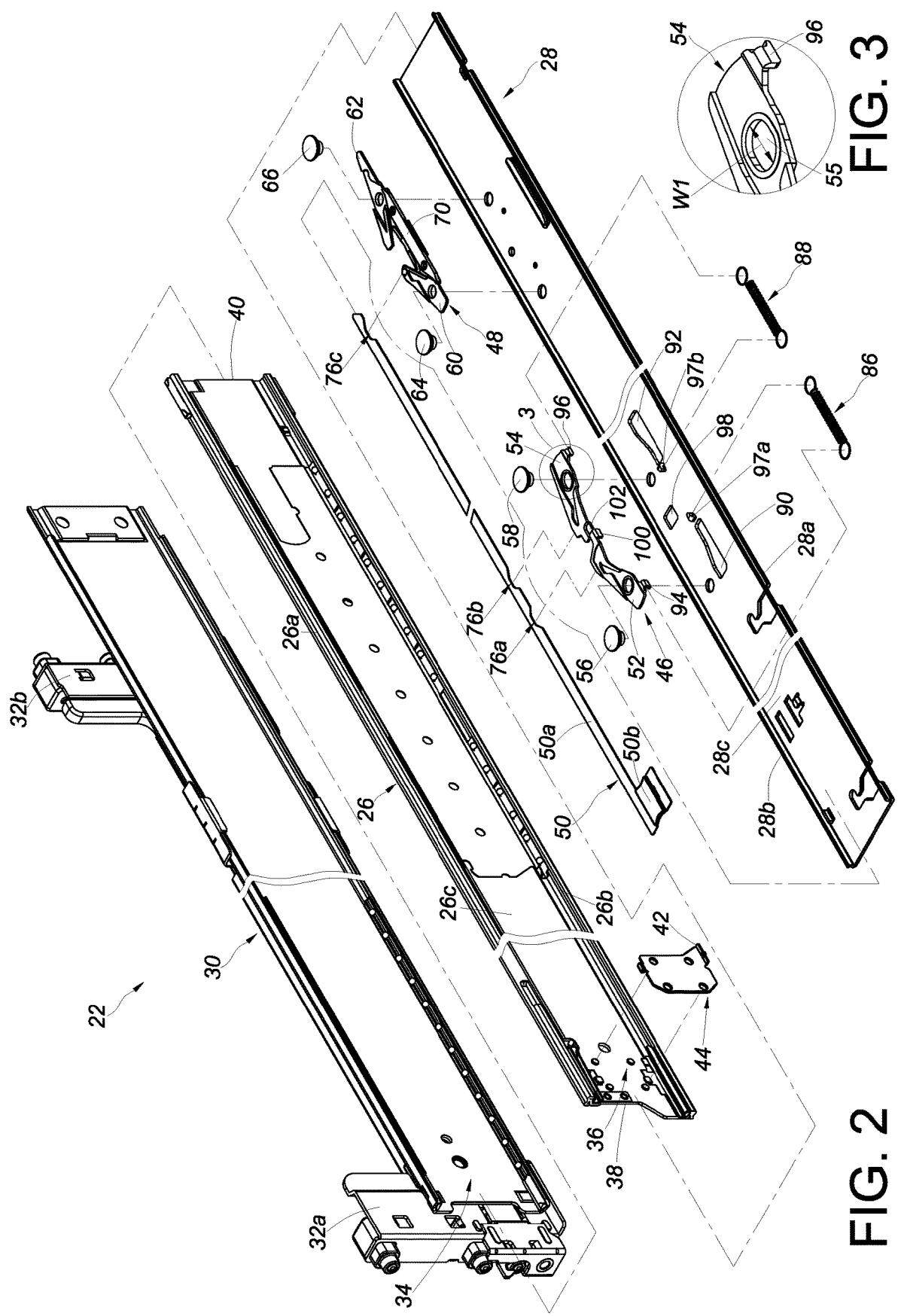

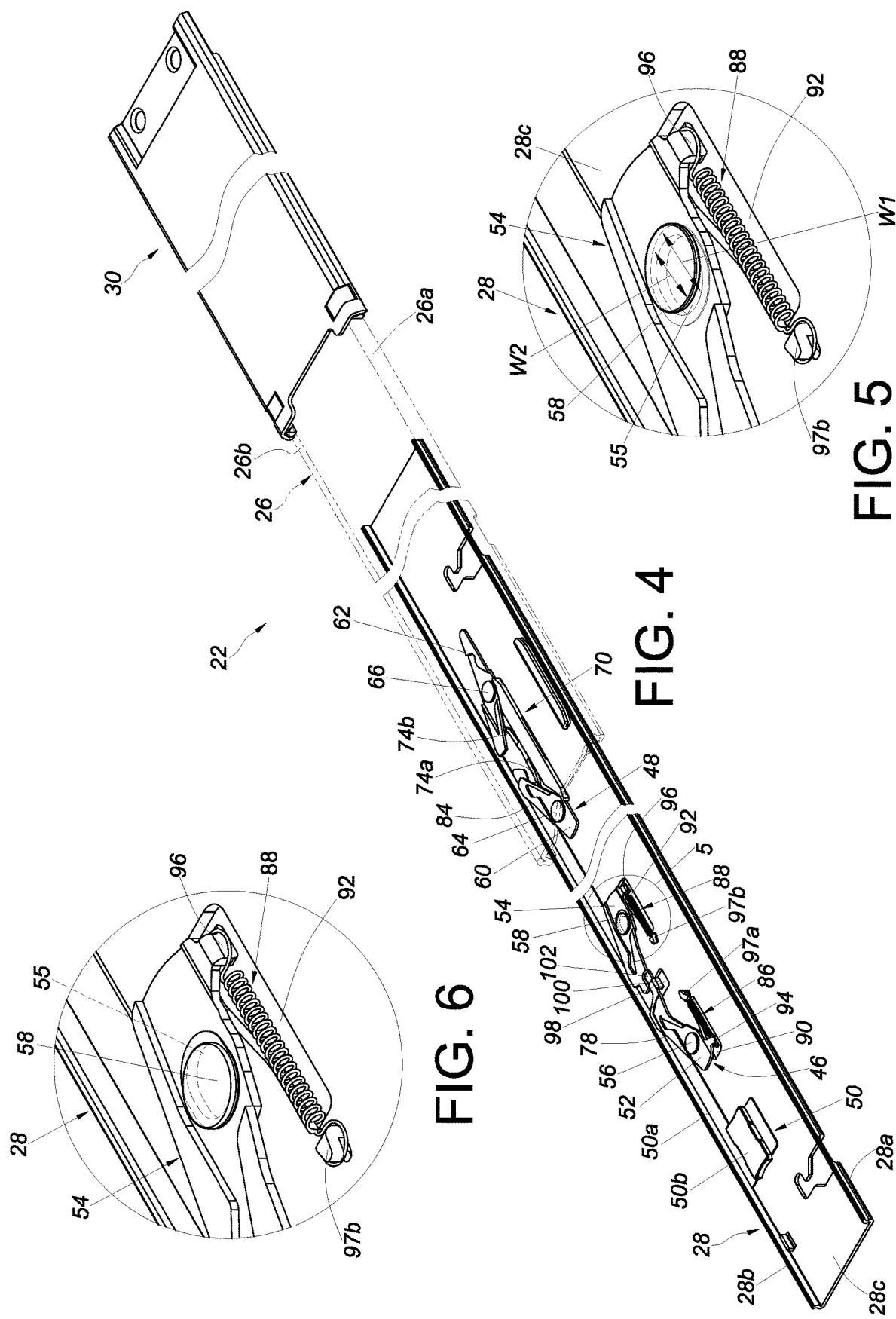

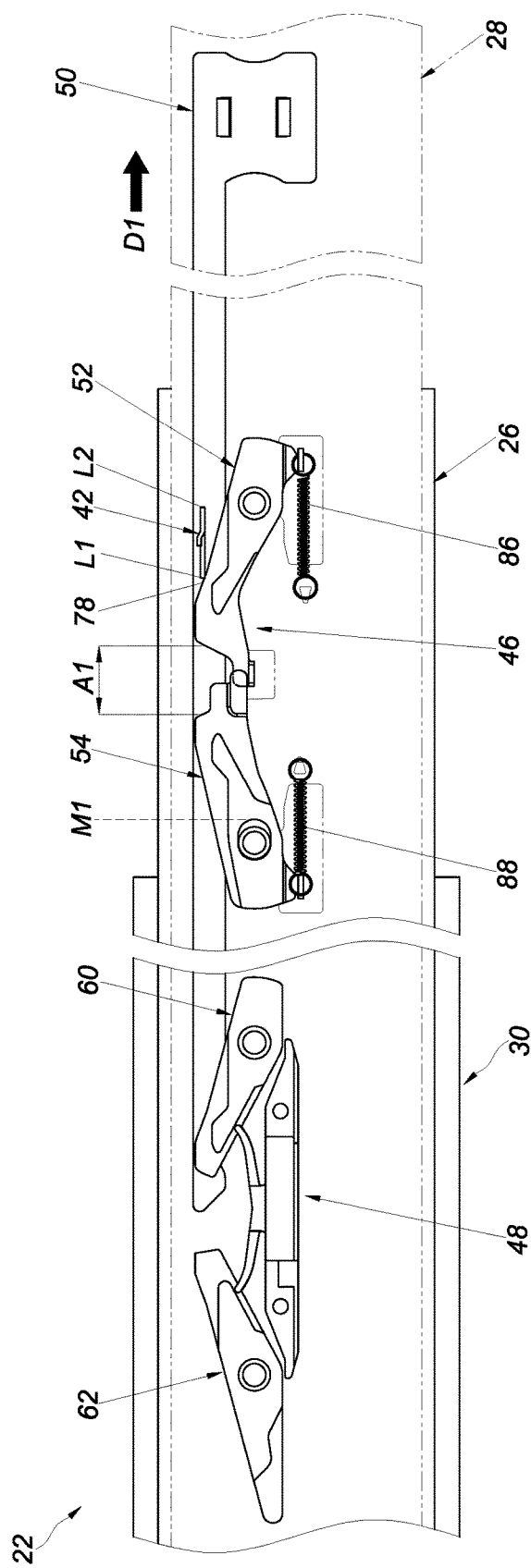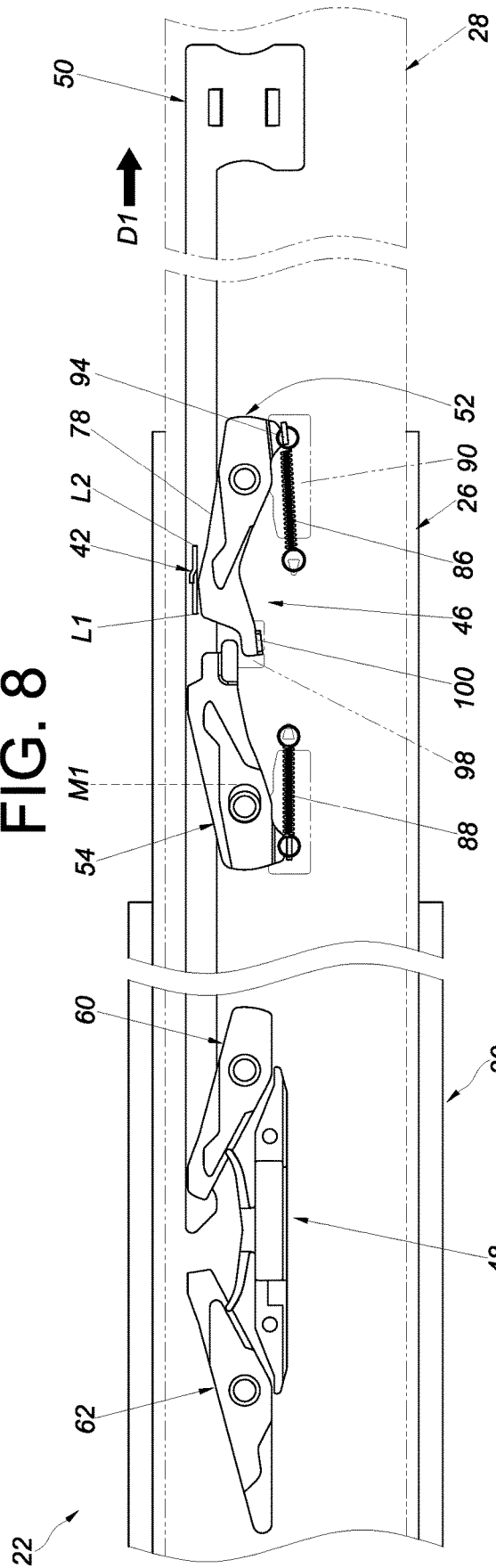

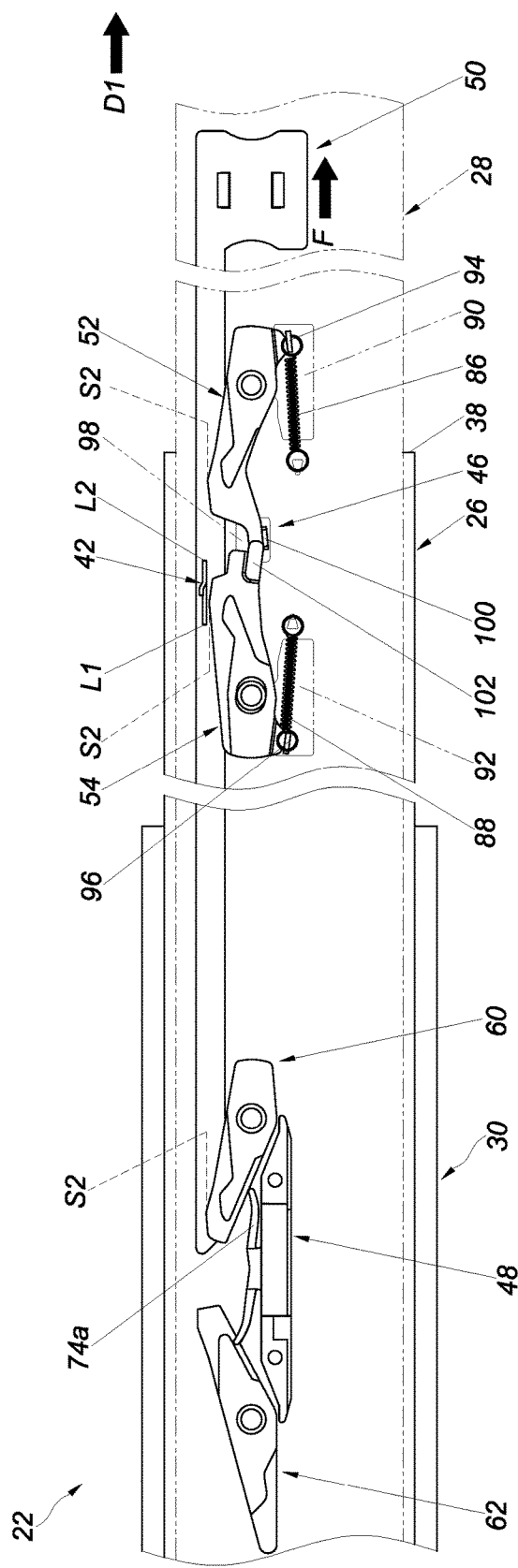

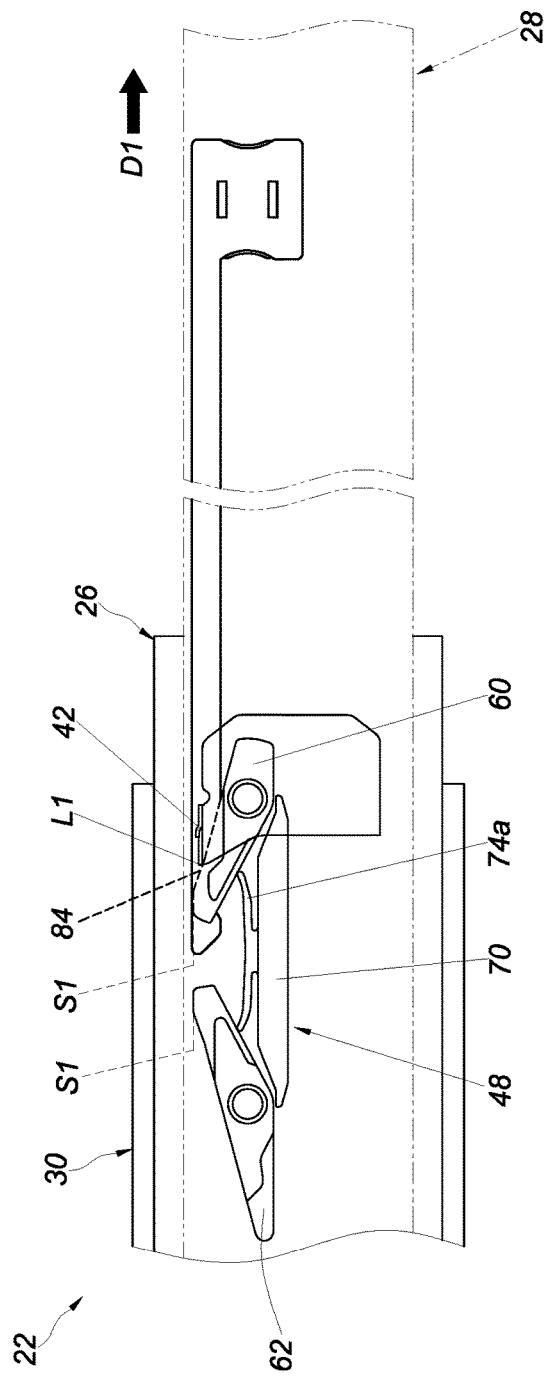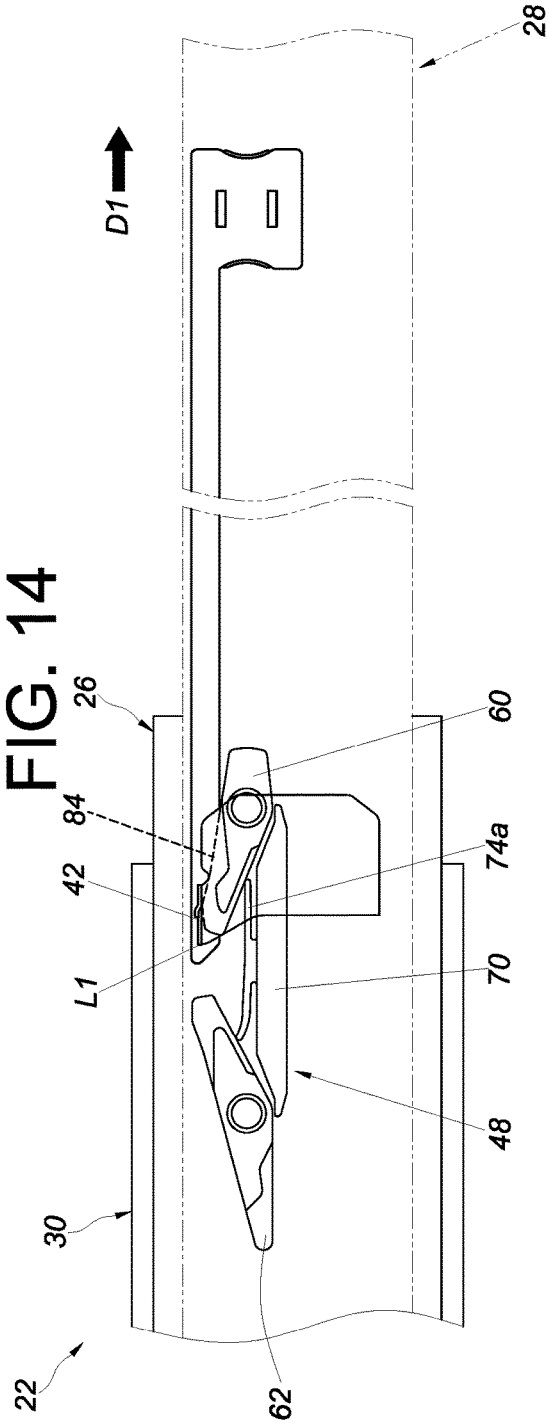

SLIDE RAIL ASSEMBLY AND RAIL KIT THEREOF

FIELD OF THE INVENTION

The present invention relates to a slide rail and more particularly to a slide rail assembly that can be locked in two stages.

BACKGROUND OF THE INVENTION

A slide rail assembly typically includes a first rail and a second rail configured to be displaced with respect to the first rail. A blocking structure is generally also provided between the first rail and the second rail so that, once the second rail reaches a predetermined position after displacement in a certain direction with respect to the first rail, the blocking structure can prevent the second rail from further displacement in that direction with respect to the first ail and thereby keep the second rail at the predetermined position. With the advancement of technology, a related product has been developed in which not only can the second rail be kept at a predetermined position with respect to the first rail via a blocking mechanism, but also the blocking mechanism can be deactivated through an operating member so that the second rail can be further displaced in a certain direction with respect to the first rail. U.S. Pat. No. 6,412,891 B1, for example, discloses a slide rail assembly that includes an outer rail (20), an inner rail (30), a blocking member (50), and a locking member (70). The locking member (70) is pivotally connected to the inner rail (30). When the inner rail (30) is at a certain position with respect to the outer rail (20), the locking member (70) and the blocking member (50) are blocked by each other to prevent arbitrary displacement of the inner rail (30) with respect to the outer rail (20).

As market demands vary, it is worthwhile to develop a different slide rail product (e.g., slide rail assembly) that has an at least two-stage locking mechanism.

SUMMARY OF THE INVENTION

The present invention provides a slide rail assembly that can be locked in two stages but can be completely unlocked through a single operation.

According to one aspect of the present invention, a slide rail assembly includes a first rail, a second rail, a first locking mechanism, a second locking mechanism, and an operating member. The first rail includes a blocking portion, which has a width. The second rail can be longitudinally displaced with respect to the first rail. The first locking mechanism is disposed on the second rail and includes a first element, a second element, a first elastic element, and a second elastic element. The first elastic element is configured to apply an elastic force to the first element. The second element is configured to be at either of a first position and a second position with respect to the second rail and stays at the first position in response to the elastic force of the second elastic element. A first space smaller than the width of the blocking portion is defined between the second element and the first element when the second element is at the first position. The second locking mechanism is also disposed on the second rail. The operating member is operatively connected to the first locking mechanism and the second locking mechanism. When the second rail reaches a predetermined position after displacement from a retracted position with respect to the first rail in a first direction, the second element of the first locking mechanism comes into contact with the blocking portion of the first rail. When the second rail reaches a first predetermined position after further displacement with respect to the first rail in the first direction and thus extends beyond the front end of the first rail by a first distance, the second element arrives at the second position with respect to the second rail; as a result, the second elastic element accumulates an elastic force, the first space between the second element and the first element is changed into a locking space, and the blocking portion of the first rail is locked in the locking space such that the second element and the first element are locked to the blocking portion. Once the second element and the first element are unlocked from the blocking portion by operating the operating member, the second elastic element releases the accumulated elastic force and thereby brings the second element back to the first position. When the second rail reaches a second predetermined position after displacement from the first predetermined position with respect to the first rail in the first direction and thus extends beyond the front end of the first rail by a second distance, the second locking mechanism is locked to the blocking portion of the first rail. The operating member can be operated to drive the first locking mechanism and the second locking mechanism from a locking state to an unlocking state, thereby allowing the second rail to be retracted with respect to the first rail in a second direction.

Preferably, the first element is rotatably mounted on the second rail via a first shaft, and the second element is rotatably mounted on the second rail via a second shaft.

Preferably, one of the second element and the second rail includes a slot, and the second shaft extends through a portion of the slot so that the second element can arrive at either of the first position and the second position.

Preferably, the second elastic element is a spring.

Preferably, the first elastic element is a spring.

Preferably, the first elastic element and the second elastic element are disposed in substantially the same direction.

Preferably, the second elastic element is disposed along a longitudinal direction of the second rail.

Preferably, the second rail includes a first position-limiting feature and a second position-limiting feature, and the first element and the second element include a first structure and a second structure respectively, wherein the first structure and the second structure are configured to work with the first position-limiting feature and the second position-limiting feature respectively.

Preferably, the second rail further includes a third position-limiting feature, and the first element and the second element include a third structure and a fourth structure respectively, wherein the third structure and the fourth structure are configured to work with the third position-limiting feature.

Preferably, the first shaft is located between the third structure and the first structure, and the second shaft is located between the fourth structure and the second structure.

Preferably, the first element includes a first guiding feature and can move past a first side of the blocking portion to a second side of the blocking portion in the first direction thanks to the first guiding feature.

Preferably, the first element and the second element are located respectively at the two sides of the blocking portion and are in the locking state when the second rail is at the first predetermined position.

Preferably, the operating member can be operated to change the first element and the second element from the locking state to the unlocking state, thereby allowing the second rail to be displaced from the first predetermined position with respect to the first rail to the second predetermined position in the first direction.

Preferably, the second locking mechanism includes a third element pivotally connected to the second rail.

Preferably, the slide rail assembly further includes a base with an elastic portion for applying an elastic force to the third element.

Preferably, the third element includes a guiding structure and can move past the first side of the blocking portion to the second side of the blocking portion in the first direction thanks to the guiding structure.

Preferably, the third element is at the second side of the blocking portion and is in the locking state when the second rail is at the second predetermined position.

Preferably, the operating member can be operated to change the third element, the second element, and the first element from the locking state to the unlocking state, thereby allowing the second rail to be retracted from the second predetermined position with respect to the first rail in the second direction.

Preferably, the slide rail assembly further includes a third rail, and the first rail is movably mounted between the third rail and the second rail.

According to another aspect of the present invention, a rail kit includes a slide rail, a first locking mechanism, a second locking mechanism, and an operating member. The first locking mechanism and the second locking mechanism are disposed at two different portions of the slide rail respectively. The first locking mechanism includes a first element, a second element, a first elastic element, and a second elastic element. The first elastic element is configured to apply an elastic force to the first element. The second element is rotatably mounted on the slide rail via a shaft. A slot is provided in one of the second element and the second rail, and the shaft extends through a portion of the slot so that the second element can arrive at either of a first position and a second position. The second element is configured to be kept at the first position in response to the elastic force of the second elastic element. The operating member is configured to operate the first locking mechanism and the second locking mechanism. When the second element is at the first position, a first space is defined between the second element and the first element. When the second element is at the second position, the first space is changed into a locking space larger than the first space. The second elastic element is disposed substantially along the length of the slide rail.

BRIEF DESCRIPTION OF THE DRAWINGS

FIG. 2 is an exploded perspective view of the slide rail assembly according to the embodiment of the present invention;

FIG. 3 is an enlarged view of the circled area 3 in FIG. 2;

FIG. 4 is an assembled perspective view of the slide rail assembly according to the embodiment of the present invention;

FIG. 5 is an enlarged view of the circled area 5 in FIG. 4;

FIG. 6 an assembled perspective view of the second rail and the second element in another implemented example according to the embodiment of the present invention;

FIG. 8 is a schematic view showing that the second rail of the slide rail assembly is displaced with respect to the first rail in a first direction;

FIG. 9 is a schematic view showing that the second rail of the slide rail assembly is further displaced with respect to the first rail in the first direction;

FIG. 12 is a schematic view showing that a force is applied to the operating member to unlock the first locking mechanism from the blocking portion of the first rail, allowing the second rail to be further displaced in the first direction;

FIG. 13 is a schematic view showing that the force is no longer applied to the operating member, and that the second rail is further displaced in the first direction;

FIG. 14 is a schematic view showing that the second rail of the slide rail assembly is further displaced with respect to the first rail in the first direction;

FIG. 15 is a schematic view showing that the second rail of the slide rail assembly is further displaced with respect to the first rail in the first direction;

DETAILED DESCRIPTION OF THE INVENTION

Figure 1:
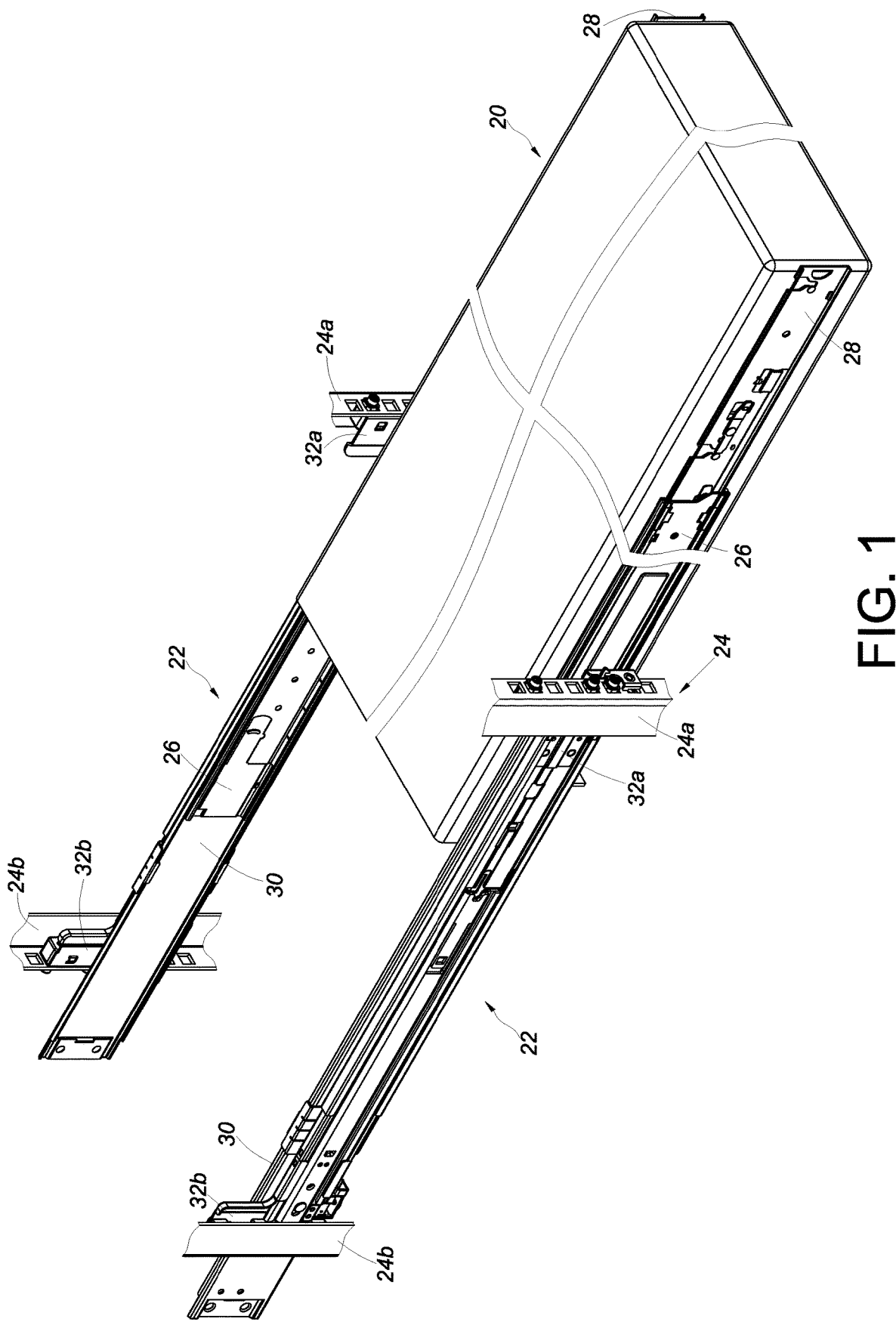
FIG. 1 is a perspective view showing how an object is mounted on a rack through a pair of slide rail assemblies according to an embodiment of the present invention.

Referring to FIG. 1, an object 20 is mounted on the plural posts (e.g., a pair of first posts 24a and a pair of second posts 24b) of a rack 24 via a pair of slide rail assemblies 22 according to an embodiment of the present invention. Each slide rail assembly 22 includes a first rail 26, a second rail 28, and preferably also a third rail 30, wherein the first rail 26 is movably mounted between the third rail 30 and the second rail 28, the third rail 30 is mounted on the corresponding first post 24a via a first bracket 32a and on the corresponding second post 24b via a second bracket 32b, and the second rail 28 carries the object 20 so that the object 20 can be pulled out of and pushed back into the rack 24 through the second rail 28.

As shown in FIG. 2 to FIG. 4, the first bracket 32a and the second bracket 32b are disposed respectively at two portions (e.g., a front portion and a rear portion) of the third rail 30 of the slide rail assembly 22, and the third rail 30 defines a first channel 34.

The first rail 26 is movably mounted in the first channel 34 of the third rail 30. The first rail 26 includes a first wall 26a, a second wall 26b, and a sidewall 26c connected between the first wall 26a and the second wall 26b. The first wall 26a, the second wall 26b, and the sidewall 26c jointly define a second channel 36. More specifically, the first rail 26 includes a front end 38, a rear end 40, and a blocking portion 42 (see FIG. 2). The blocking portion 42 lies between the front end 38 and the rear end 40 and is in the second channel 36. Preferably, the blocking portion 42 is adjacent to the front end 38 of the first rail 26. The blocking portion 42 may be a projection integrated with the sidewall 26c of the first rail 26, or a fitting 44 including the blocking portion 42 may be connected to the first rail 26 by riveting, soldering, or threaded connection such that the blocking portion 42 protrudes from the sidewall 26c of the first rail 26; the present invention has no limitation in this regard.

The second rail 28 is movably mounted in the second channel 36 of the first rail 26. The second rail 28 includes a first wall 28a, a second wall 28b, and a sidewall 28c connected between the first wall 28a and the second wall 28b.

The slide rail assembly 22 further includes a first locking mechanism 46, a second locking mechanism 48, and an operating member 50.

The first locking mechanism 46 and the second locking mechanism 48 are disposed at two different portions of the second rail 28 respectively. For example, the first locking mechanism 46 is closer to the front end of the second rail 28 than the second locking mechanism 48 is, and the second locking mechanism 48 is closer to the rear end of the second rail 28 than the first locking mechanism 46 is. The two locking mechanisms, however, are not necessarily so arranged in practice. The first locking mechanism 46 and the second locking mechanism 48 are located on the sidewall 28c of the second rail 28 and are spaced apart from each other. The second rail 28 (also referred to as a slide rail in the claims), the first locking mechanism 46, the second locking mechanism 48, and the operating member 50 constitute a rail kit.

The first locking mechanism 46 includes a first element 52, a second element 54, a first elastic element 86, and a second elastic element 88. The first element 52 and the second element 54 are movably mounted on the second rail 28. More specifically, the first element 52 is pivotally connected to the sidewall 28c of the second rail 28 via a first shaft 56, and the second element 54 is pivotally connected to the sidewall 28c of the second rail 28 via a second shaft 58 (also referred to in the claims as a shaft). The first elastic element 86 is configured to apply an elastic force to the first element 52, and the second elastic element 88 is configured to apply an elastic force to the second element 54. Preferably, the first elastic element 86 and the second elastic element 88 are two separate springs (e.g., extension springs); alternatively, a single elastic element may be used to apply an elastic force to the first element 52 and the second element 54. Preferably, the first elastic element 86 is disposed in a direction that extends substantially along the length of the second rail 28, and so is the second elastic element 88. For example, both elastic elements are disposed along the longitudinal direction of the second rail 28.

Preferably, the second rail 28 includes a first position-limiting feature 90 and a second position-limiting feature 92, the first element 52 includes a first structure 94 configured to work with the first position-limiting feature 90, and the second element 54 includes a second structure 96 configured to work with the second position-limiting feature 92. In this embodiment, the first position-limiting feature 90 is a first opening, and the first structure 94 is a first projection extending into the first opening and located between two opposite walls of the first opening. Similarly, the second position-limiting feature 92 is a second opening, and the second structure 96 is a second projection extending into the second opening and located between two opposite walls of the second opening. Please note that the first opening and the second opening do not necessarily have a hollow configuration and may be grooves instead.

Preferably, the second rail 28 further includes a first connecting portion 97a and a second connecting portion 97b on the sidewall 28c. Here, the first connecting portion 97a and the second connecting portion 97b are projecting hooks by way of example only. The two connecting portions may, for example, be fastening holes instead. The first elastic element 86 is mounted between the first connecting portion 97a and the first structure 94, and the second elastic element 88 is mounted between the second connecting portion 97b and the second structure 96. Preferably, the second rail 28 further includes a third position-limiting feature 98, the first element 52 further includes a third structure 100 configured to work with the third position-limiting feature 98, and the second element 54 further includes a fourth structure 102 configured to work with the third position-limiting feature 98. In this embodiment, the third position-limiting feature 98 is a third opening, and the third structure 100 is a third projection extending into the third opening and located between two opposite walls of the third opening. Please note that the third opening does not necessarily have a hollow configuration and may be a groove instead. Preferably, the fourth structure 102 is, for example, an extension wall of the second element 54 and corresponds in position to the third structure 100. More specifically, the fourth structure 102 and the third structure 100 abut against each other when in a predetermined state. In addition, the first shaft 56 is located between the third structure 100 and the first structure 94, and the second shaft 58 is located between the fourth structure 102 and the second structure 96.

In one preferred embodiment, the second element 54 can be longitudinally displaced with respect to the first element 52 in a bounded area. For example, a slot 55 is provided in one of the second element 54 and the second rail 28. In FIG. 3, the slot 55 is shown as formed in the second element 54.

More specifically, the slot 55 is formed as an elliptical hole by way of example, and the second shaft 58 can be passed through the slot 55. Preferably, the slot 55 extends along the length (i.e., the longitudinal direction) of the second rail 28. The shank of the second shaft 58 (see FIG. 5) extends through a portion of the slot 55 and is connected to the sidewall 28c of the second rail 28 so that the second element 54 can be longitudinally displaced with respect to the second shaft 58 or the second rail 28. For example, the slot 55 has a hole diameter W1 greater than the shank diameter W2 of the second shaft 58, and the second element 54 can be longitudinally displaced with respect to the second shaft 58 in an area defined by the hole diameter W1 and the shank diameter W2.

The second element 54 stays at a first position with respect to the second shaft 58 or the second rail 28 in response to the elastic force of the second elastic element 88. In another implemented example as shown in FIG. 6, the slot 55 is provided in the second rail 28 instead, and the shank of the second shaft 58 extends through a portion of the slot 55 to enable longitudinal displacement of the second element 54 within a bounded area. The configuration of the slot 55, therefore, is by no means limited to that shown in FIG. 5.

Referring to FIG. 2 and FIG. 4, the second locking mechanism 48 includes a third element 60 and preferably also a fourth element 62. The third element 60 and the fourth element 62 are separately rotatably mounted on the second rail 28. More specifically, the third element 60 is pivotally connected to the sidewall 28c of the second rail 28 via a third shaft 64, and the fourth element 62 is pivotally connected to the sidewall 28c of the second rail 28 via a fourth shaft 66.

Preferably, the slide rail assembly 22 or the rail kit further includes a base 70 fixedly connected to the sidewall 28c of the second rail 28. The base 70 includes a first elastic portion 74a for applying an elastic force to the third element 60 and a second elastic portion 74b for applying an elastic force to the fourth element 62.

The operating member 50 is configured to operate the first locking mechanism 46 and the second locking mechanism 48. For example, the operating member 50 can be used to operate the first element 52 and the second element 54 of the first locking mechanism 46 and the third element 60 of the second locking mechanism 48. Here, the operating member 50 is disposed on the second rail 28 and is operatively connected to the first element 52 and the second element 54 of the first locking mechanism 46 and the third element 60 of the second locking mechanism 48 by way of example.

More specifically, the operating member 50 includes an extension portion 50a. The extension portion 50a has a predetermined length, which extends in the same direction as the length of the second rail 28. Preferably, the operating member 50 further includes an operating portion 50b connected to the extension portion 50a. The extension portion 50a includes a plurality of driving structures, such as a first driving structure 76a, a second driving structure 76b, and a third driving structure 76c, which are sequentially disposed along the length of the extension portion 50a and each have a structure (e.g., a recessed or protruding portion) corresponding to and configured to work with the first element 52, the second element 54, or the third element 60. The operating member 50 can operate the first element 52, the second element 54, and the third element 60 through the first driving structure 76a, the second driving structure 76b, and the third driving structure 76c respectively (see FIG. 2).

Preferably, the first element 52 includes a first guiding feature 78, which is an inclined or curved surface. Preferably, the third element 60 includes a guiding structure 84, which is also an inclined or curved surface (see FIG. 4).

Figure 7:
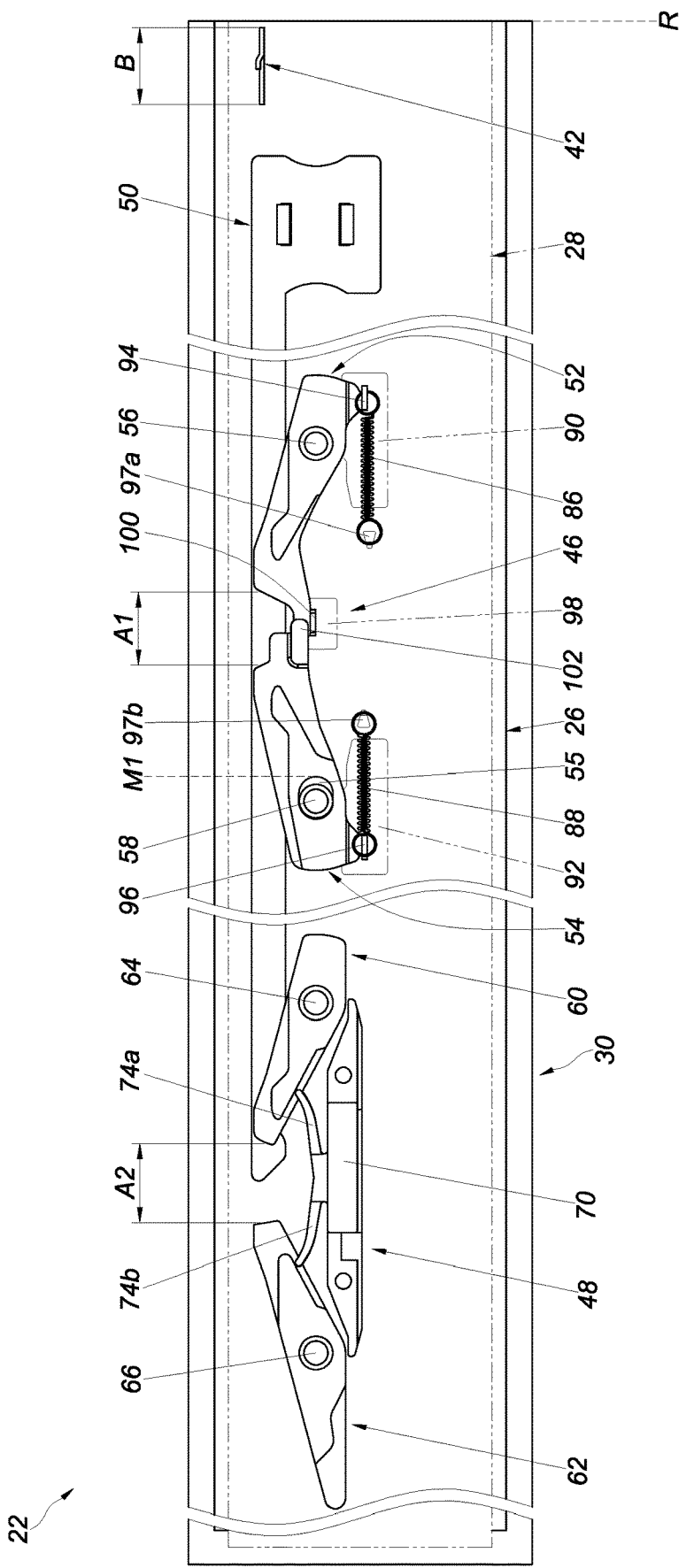
FIG. 7 is a schematic view showing that the slide rail assembly is in a retracted state.

FIG. 7 shows the slide rail assembly 22 in a retracted state, in which the second rail 28 is at a retracted position R with respect to the first rail 26 and the first rail 26 is retracted with respect to the third rail 30. It is worth mentioning that the second element 54 of the first locking mechanism 46 is kept at the first position M1 with respect to the second rail 28 by the elastic force of the second elastic element 88. While the second element 54 is at the first position M1, a first space A1 is defined between the second element 54 and the first element 52, and the first space A1 is smaller than the width B of the blocking portion 42 of the first rail 26. On the other hand, a second space A2 is defined between the third element 60 and the fourth element 62 of the second locking mechanism 48, and the width B of the blocking portion 42 of the first rail 26 is smaller than the second space A2. The relationship between A1, A2, and B can be expressed mathematically as A1<B<A2.

In FIG. 8, the second rail 28 is longitudinally displaced a certain distance from the retracted position R in a first direction D1 (e.g., an opening direction) with respect to the first rail 26 such that the first guiding feature 78 of the first element 52 is in contact with a first side L1 of the blocking portion 42 of the first rail 26.

When the second rail 28 is further displaced in the first direction D1, referring to FIG. 9, the first element 52 is tilted through an angle by the force generated by contact between the first guiding feature 78 and the first side L1 of the blocking portion 42. The tilt allows the first element 52 to move past the first side L1 of the blocking portion 42 of the first rail 26 in the first direction D1 while the first elastic element 86 accumulates an elastic force. It is worth mentioning that, while the first element 52 is tilted through the aforesaid angle, a position-limiting effect is applied to the first element 52 either by the first structure 94 of the first element 52 abutting against a wall of the first position-limiting feature 90 (e.g., the first opening) or by the third structure 100 of the first element 52 abutting against a wall of the third position-limiting feature 98 (e.g., the third opening), i.e., the displacement of the first element 52 is limited by the first position-limiting feature 90 and/or the third position-limiting feature 98 working with the first element 52.

Figure 10:
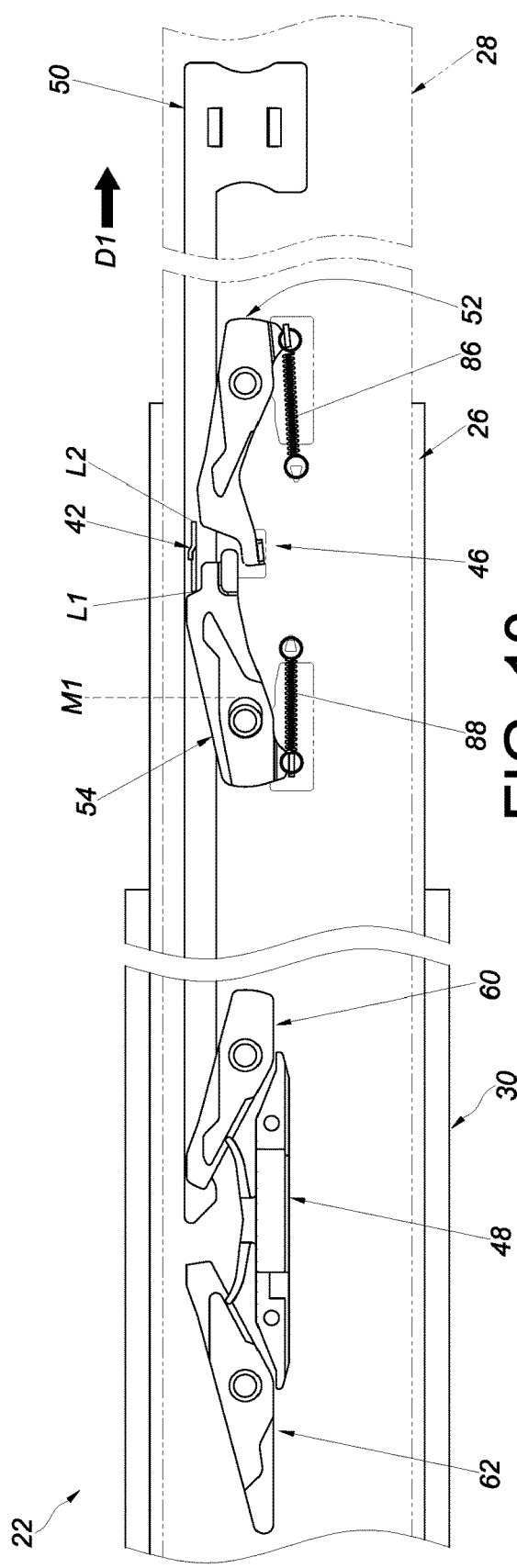
FIG. 10 is a schematic view showing that the second rail of the slide rail assembly is further displaced with respect to the first rail in the first direction.
Figure 11:
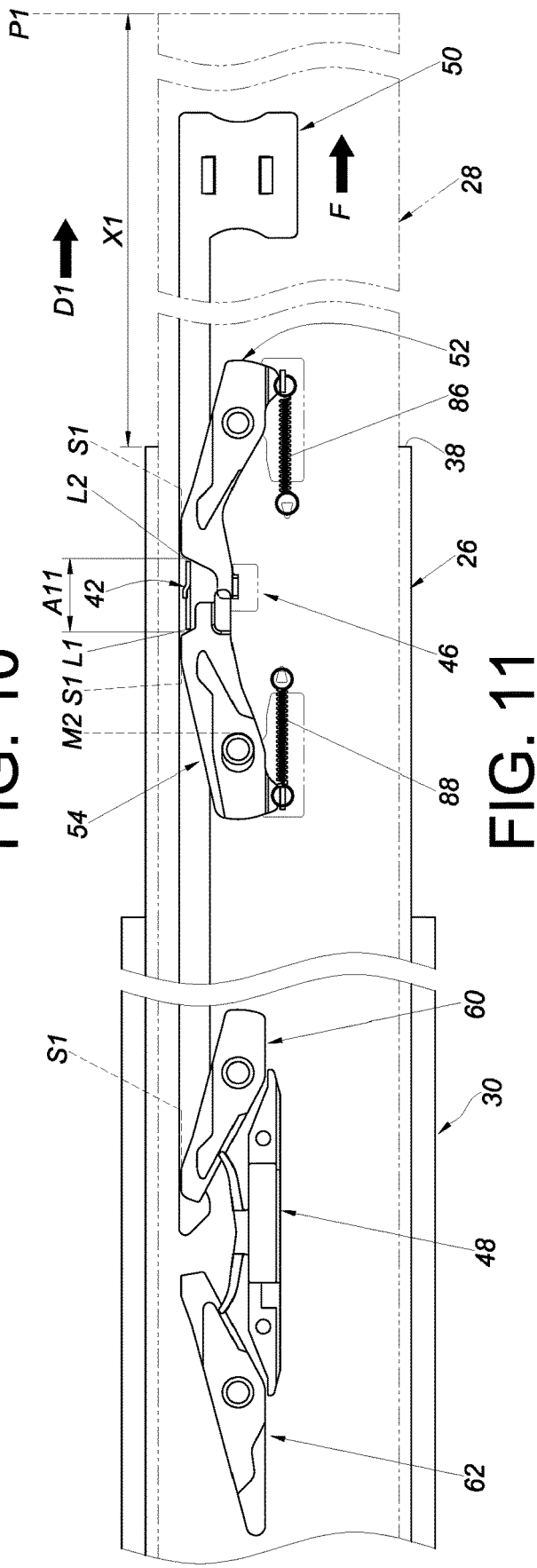
FIG. 11 is a schematic view showing that the second rail of the slide rail assembly reaches a first predetermined position after displacement with respect to the first rail in the first direction, and that the first locking mechanism is locked to a blocking portion of the first rail.

When the second rail 28 reaches a predetermined position after further displacement with respect to the first rail 26 in the first direction D1, referring to FIG. 10, the second element 54 of the first locking mechanism 46 comes into contact with and is pressed against the first side L1 of the blocking portion 42 of the first rail 26. Once arriving at a first predetermined position P1 after further displacement with respect to the first rail 26 in the first direction D1, referring to FIG. 11, the second rail 28 extends beyond the front end 38 of the first rail 26 by a first distance X1, and the slide rail assembly 22 is in a first extended state. During the process, the second element 54 is moved with respect to the second rail 28 from the first position M1 to a second position M2 while the second elastic element 88 accumulates an elastic force, and the first space A1 is thus enlarged into a locking space A11; as a result, the blocking portion 42 of the first rail 26 is locked in the locking space A11. More specifically, when the second rail 28 is at the first predetermined position P1, the first element 52 is pivoted back to its original angular position and reaches a second side L2 of the blocking portion 42 in response to the elastic force released from the first elastic element 86; on the other hand, the second element 54 is at the first side L1 of the blocking portion 42. In consequence, the first element 52 and the second element 54 are at the two sides of the blocking portion 42 respectively and are in a locking state S1 to prevent the second rail 28 from arbitrary displacement with respect to the first rail 26. It is worth mentioning that the elastic force of the second elastic element 88 as well as the first element 52 helps lock the second element 54 securely to the blocking portion 42.

Referring to FIG. 12, the operating member 50 can be operated to unlock the first locking mechanism 46 from the blocking portion 42. For example, a user can operate the operating member 50 by applying a force F thereto so that the first element 52 and the second element 54 (together with the third element 60) are tilted by an angle by the operating member 50 and are thus changed from the locking state S1 to an unlocking state S2, in which the first element 52 and the second element 54 are no longer locked to the blocking portion 42, and in which each of the first elastic element 86, the second elastic element 88, and the first elastic portion 74a stores an elastic force. It is worth mentioning that, while the second element 54 is tilted through the aforesaid angle to enter the unlocking state S2, a position-limiting effect is applied either to the second element 54 by the second structure 96 of the second element 54 abutting against a wall of the second position-limiting feature 92 (e.g., the second opening), or to the fourth structure 102 of the second element 54 by the third structure 100 of the first element 52 abutting against a wall of the third position-limiting feature 98 (e.g., the third opening). Also, while the first element 52 is tilted through the aforesaid angle to enter the unlocking state S2, a position-limiting effect is applied to the first element 52 either by the first structure 94 of the first element 52 abutting against a wall of the first position-limiting feature 90 (e.g., the first opening) or by the third structure 100 of the first element 52 abutting against a wall of the third position-limiting feature 98 (e.g., the third opening).

When the first element 52 and the second element 54 are no longer locked to the blocking portion 42, referring to FIG. 13, the second rail 28 can be further displaced with respect to the first rail 26 in the first direction D1. It is worth mentioning that the first element 52, the second element 54, and the third element 60 are respectively brought back to the locking state S1 from the unlocking state S2 by the elastic force of the first elastic element 86, of the second elastic element 88, and of the first elastic portion 74a as soon as the user stops applying the force F to the operating member 50. More specifically, once the force F is removed and the first locking mechanism 46 is unlocked from the blocking portion 42 (thereby moving the second element 54 away from the first side L1 of the blocking portion 42 of the first rail 26), the second elastic element 88 releases the stored elastic force, which acts on the second element 54 and returns the second element 54 from the second position M2 to the first position M1; consequently, the locking space A11 is reduced to the first space A1.

It is worth mentioning that the direction of the second elastic element 88, which extends substantially along the length (i.e., the longitudinal direction) of the second rail 28, facilitates longitudinal displacement of the second element 54 from the second position M2 back to the first position M1 in response to the elastic force released from the second elastic element 88. This, in turn, ensures that the locking space A11 will shrink to the first space A1 reliably.

Referring to FIG. 14, once the first locking mechanism 46 is unlocked from the blocking portion 42, the second rail 28 can be displaced with respect to the first rail 26 from the first predetermined position P1 to another predetermined position in the first direction D1 such that the guiding structure 84 of the third element 60 of the second locking mechanism 48 comes into contact with the first side L1 of the blocking portion 42 of the first rail 26.

When the second rail 28 is further displaced in the first direction D1, referring to FIG. 15, the third element 60 is tilted through an angle by the force generated by contact between the guiding structure 84 and the first side L1 of the blocking portion 42 and is thus brought out of the locking state S1. The tilt allows the third element 60 to move past the first side L1 of the blocking portion 42 of the first rail 26 in the first direction D1 while the first elastic portion 74a of the base 70 accumulates an elastic force.

Figure 16:
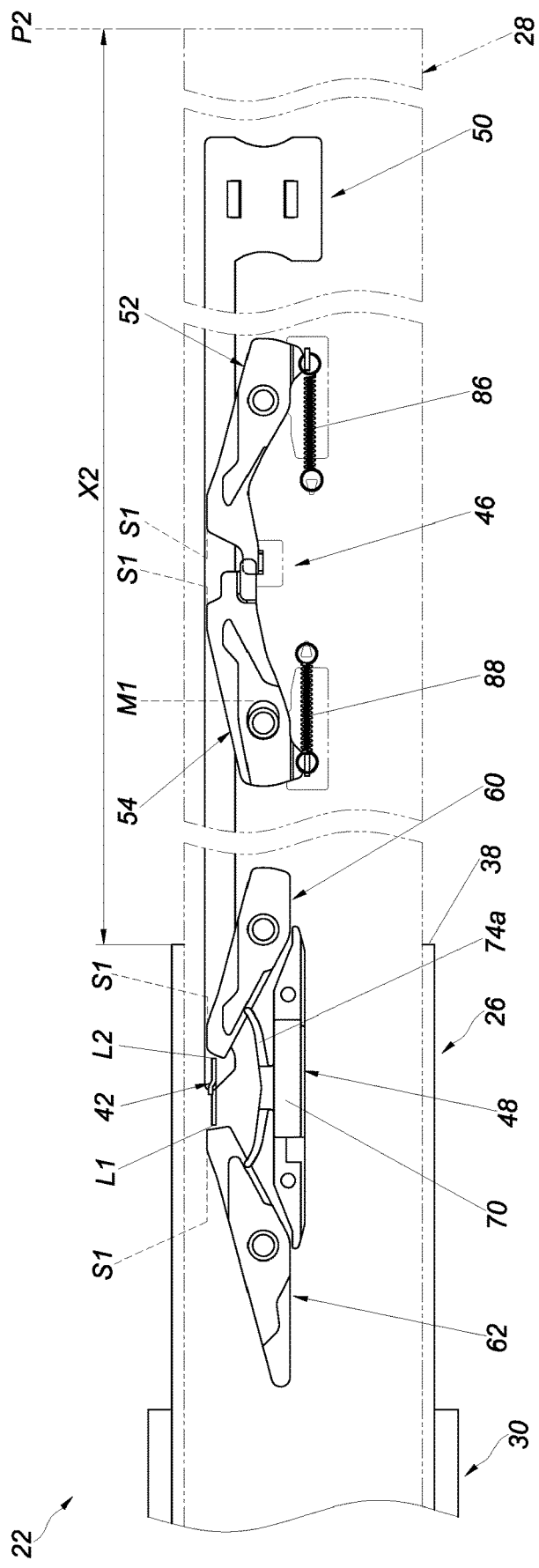
FIG. 16 is a schematic view showing that the second rail of the slide rail assembly reaches a second predetermined position after displacement with respect to the first rail in the first direction, and that the second locking mechanism is locked to the blocking portion of the first rail.

Referring to FIG. 16, when the second rail 28 reaches a second predetermined position P2 after further displacement with respect to the first rail 26 in the first direction D1 and hence extends beyond the front end 38 of the first rail 26 by a second distance X2 greater than the first distance X1, the slide rail assembly 22 is in a second extended state, in which the second locking mechanism 48 is locked to the blocking portion 42 of the first rail 26. For example, when the second rail 28 arrives at the second predetermined position P2 after displacement with respect to the first rail 26 in the first direction D1, the third element 60 reaches the second side L2 of the blocking portion 42 in response to the elastic force released from the first elastic portion 74a of the base 70; on the other hand, the fourth element 62 is at the first side L1 of the blocking portion 42. Consequently, the third element 60 and the fourth element 62 are at the two sides of the blocking portion 42 respectively and are in the locking state S1 to prevent the second rail 28 from arbitrary displacement with respect to the first rail 26.

Figure 17:
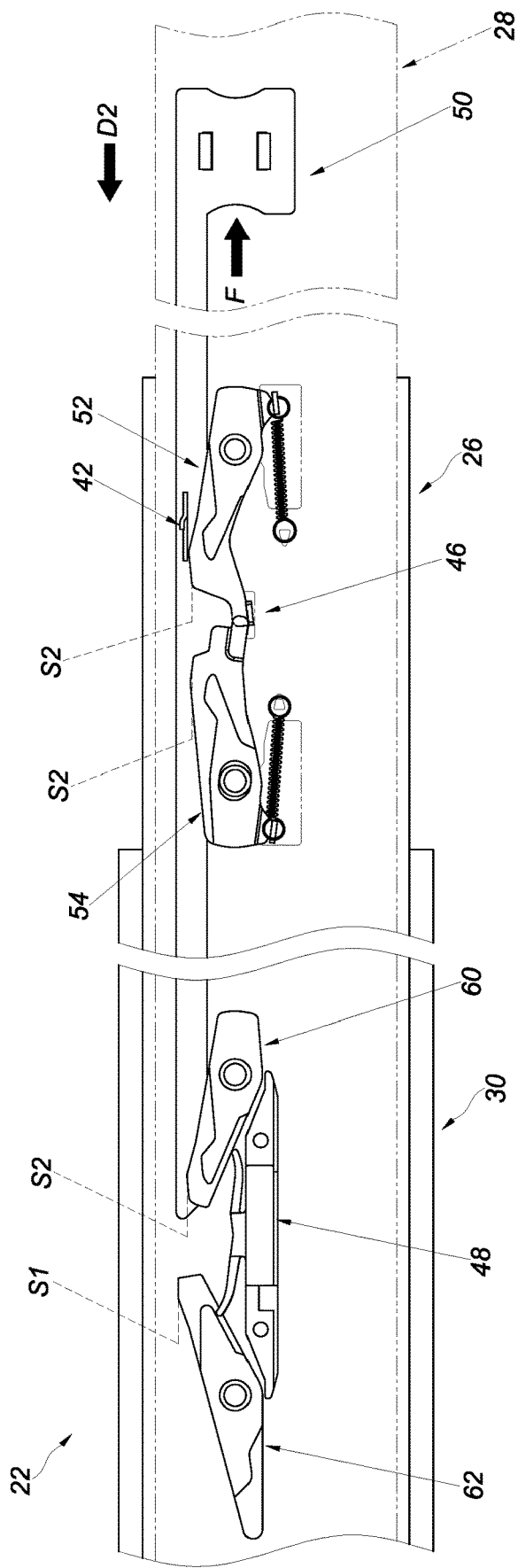
FIG. 17 is a schematic view showing that the operating member is operated to bring the related elements of the second locking mechanism and of the first locking mechanism from the locking state to the unlocking state, thereby allowing the second rail to be retracted with respect to the first rail in a second direction.

Referring to FIG. 17, the operating member 50 can operate the third element 60, the second element 54, and the first element 52 via the third driving structure 76c, the second driving structure 76b, and the first driving structure 76a respectively (see FIG. 2). For example, the user can subsequently apply a force F to, and thereby operate, the operating member 50 so that the third element 60 of the second locking mechanism 48 and the second element 54 and the first element 52 of the first locking mechanism 46 are changed from the locking state S1 to the unlocking state S2, in which the third element 60 is no longer locked to the blocking portion 42 (and neither will the second element 54 and the first element 52 be locked to the blocking portion 42). Once the force F applied to the operating member 50 is removed, the first locking mechanism 46 re-forms the first space A1, which is smaller than the width B of the blocking portion 42 of the first rail 26. As the blocking portion 42 of the first rail 26 will not be locked in the first space A1 of the first locking mechanism 46, the second rail 28 can be retracted directly from the second predetermined position P2 with respect to the first rail 26 in a second direction D2, which is the opposite direction of the first direction D1. That is to say, the slide rail assembly 22 according to this embodiment can be locked in two stages but can be completely unlocked in one step.

It can be known from the above that the foregoing slide rail assembly 22 has preferably the following features:

1. The slide rail assembly 22 has a two-stage locking mechanism. For example, the slide rail assembly 22 can be locked for the first time (to prevent the second rail 28 from being arbitrarily displaced with respect to the first rail 26) when the second rail 28 is at the first predetermined position P1 with respect to the first rail 26, and for the second time (to prevent the second rail 28 from being arbitrarily displaced with respect to the first rail 26, too) when the second rail 28 is at the second predetermined position P2 with respect to the first rail 26.

2. When the second rail 28 is at the second predetermined position P2 with respect to the first rail 26, a user can operate the first locking mechanism 46 and the second locking mechanism 48 at the same time using the operating member 50, in order to bring the locking mechanisms from the locking state to the unlocking state so that the second rail 28 can be retracted directly from the second predetermined position P2 to the state shown in FIG. 7 along the second direction D2 with respect to the first rail 26.

3. The second element 54 of the first locking mechanism 46 can be displaced with respect to the slide rail where the first locking mechanism 46 is provided (e.g., the second rail 28) such that the distance between the second element 54 and the first element 52 is adjustable. The blocking portion 42 of the first rail 26 cannot be locked in the first space A1 formed between the second element 54 and the first element 52 but can be locked in the locking space A11 formed between the second element 54 and the first element 52.

4. The second element 54 of the first locking mechanism 46 only requires the elastic force of one elastic element (e.g., the second elastic element 88) in order to stay in a certain state (e.g., the locking state), and such structural simplicity is expected to satisfy specific market demands. Similarly, the first element 52 of the first locking mechanism

46 only requires the elastic force of one elastic element (e.g., the first elastic element 86) in order to stay in a certain state.

5. The first elastic element 86 and the second elastic element 88 are two separate springs disposed in substantially the same direction (e.g., both disposed substantially along the length, or the longitudinal direction, of the slide rail where they are provided).
6. That the second elastic element 88 is disposed substantially along the length, or the longitudinal direction, of the slide rail where it is provided makes it easier to displace the second element 54 longitudinally from the second position M2 back to the first position M1 in response to elastic force released from the second elastic element 88. This helps ensure that the locking space A11 will be reliably reduced to the first space A1.
7. The first structure 94 of the first element 52 is configured to work with the first position-limiting feature 90 of the second rail 28, and the second structure 96 of the second element 54 is configured to work with the second position-limiting feature 92 of the second rail 28.
8. The third structure 100 of the first element 52 and the fourth structure 102 of the second element 54 are both configured to work with the third position-limiting feature 98 of the second rail 28.

While the present invention has been disclosed through the preferred embodiments described above, it should be understood that those embodiments are not intended to be restrictive of the scope of the invention. The scope of patent protection sought by the applicant is defined by the appended claims.

What is claimed is:

1. A slide rail assembly, comprising:
a first rail including a front end and a blocking portion, wherein the blocking portion has a width;
a second rail longitudinally displaceable with respect to the first rail;
a first locking mechanism disposed on the second rail and including a first element, a second element, a first elastic element, and a second elastic element, wherein the first elastic element is configured to apply an elastic force to the first element, the second element is located at either one of a first position or a second position with respect to the second rail, the second element remaining at the first position responsive to resiliency of the second elastic element, the second element and the first element define a first space therebetween when the second element is at the first position, and the first space is smaller than the width of the blocking portion;
a second locking mechanism disposed on the second rail; and
an operating member operatively connected to the first locking mechanism and the second locking mechanism;
wherein responsive to the second rail being displaced from a retracted position with respect to the first rail in a first direction, the second rail reaches a position relative to the first rail at which the second element of the first locking mechanism contacts the blocking portion of the first rail; and when the second rail reaches a first predetermined position after further displacement with respect to the first rail in the first direction to extend beyond the front end of the first rail by a first distance, the second element moves to the second position with respect to the second rail, the second elastic element responsively accumulates an elastic force, and the first space between the second element and the first element is changed into a locking space, the blocking portion of the first rail being locked in the locking space, the second element and the first element are thereby locked to the blocking portion;
wherein responsive to the second element and the first element being unlocked with respect to the blocking portion by operation of the operating member, the second elastic element releases the accumulated elastic force, the second element thereby returns to the first position; and when the second rail reaches a second predetermined position after displacement from the first predetermined position with respect to the first rail in the first direction to extend beyond the front end of the first rail by a second distance, the second locking mechanism is locked with respect to the blocking portion of the first rail;
wherein the operating member is operable to drive the first locking mechanism and the second locking mechanism from a locking state to an unlocking state, the second rail thereby being retractable with respect to the first rail in a second direction.

2. The slide rail assembly of claim 1, wherein the first element is rotatably mounted on the second rail via a first shaft, and the second element is rotatably mounted on the second rail via a second shaft.

3. The slide rail assembly of claim 2, wherein one of the second element and the second rail includes a slot, and the second shaft extends through a portion of the slot, the second element is thereby located at either of the first position or the second position.

4. The slide rail assembly of claim 3, wherein the second elastic element is a spring.

5. The slide rail assembly of claim 4, wherein the first elastic element is a spring.

6. The slide rail assembly of claim 5, wherein the first elastic element and the second elastic element are disposed in substantially a same direction.

7. The slide rail assembly of claim 2, wherein the second elastic element is disposed along a longitudinal direction of the second rail.

8. The slide rail assembly of claim 2, wherein the second rail includes a first position-limiting feature and a second position-limiting feature, the first element and the second element include a first structure and a second structure, respectively, and the first structure and the second structure are respectively movably connected with the first and second elastic elements, the first elastic element and the second elastic element being substantially retained within the first position-limiting feature and the second position-limiting feature, respectively.

9. The slide rail assembly of claim 8, wherein the second rail includes a third position-limiting feature, the first element and the second element include a third structure and a fourth structure, respectively, the third structure and the fourth structure are both movably coupled to the third position-limiting feature to be retained within the third position-limiting feature, the first shaft is located between the third structure and the first structure, and the second shaft is located between the fourth structure and the second structure.

10. The slide rail assembly of claim 3, wherein the first element includes a first guiding feature, and the first guiding feature guides the first element to move past a first side of the blocking portion to a second side of the blocking portion in the first direction.

11. The slide rail assembly of claim 10, wherein the first element and the second element are located, respectively, at the second and first sides of the blocking portion when the second rail is at the first predetermined position, the first and second elements being in the locking state when the second rail is at the first predetermined position.

12. The slide rail assembly of claim 11, wherein the operating member is operable to change the first element and the second element from the locking state to the unlocking state to thereby displace the second rail from the first predetermined position with respect to the first rail to the second predetermined position in the first direction.

13. The slide rail assembly of claim 12, wherein the second locking mechanism includes a third element pivotally connected to the second rail.

14. The slide rail assembly of claim 13, further comprising a base, wherein the base includes an elastic portion for applying an elastic force to the third element.

15. The slide rail assembly of claim 14, wherein the third element includes a guiding structure, and the guiding structure guides the third element to move past the first side of the blocking portion to the second side of the blocking portion in the first direction.

16. The slide rail assembly of claim 15, wherein the third element is at the second side of the blocking portion and is in the locking state when the second rail is at the second predetermined position.

17. The slide rail assembly of claim 16, wherein the operating member is operable to change the third element, the second element, and the first element from the locking state to the unlocking state, the second rail is thereby retractable from the second predetermined position with respect to the first rail in the second direction.

18. The slide rail assembly of claim 1, further comprising a third rail, wherein the first rail is movably mounted between the third rail and the second rail.

19. A rail kit, comprising:
   a slide rail, the slide rail being formed with a first position-limiting feature and a second position-limiting feature;
   a first locking mechanism and a second locking mechanism disposed at two different portions of the slide rail, respectively, wherein the first locking mechanism includes a first element formed with a first structure, a second element formed with a second structure, a first elastic element disposed with respect to the first position-limiting feature, and a second elastic element disposed with respect to the second position-limiting feature, the first element being rotatably mounted on the slide rail via a first shaft, the first elastic element being configured to apply an elastic force to the first element, the second element being rotatably mounted on the slide rail via a second shaft, one of the second element and the slide rail being provided with a slot, the second shaft extending through a portion of the slot, the second element thereby being located at either one of a first position or a second position, the second element remaining at the first position responsive to an elastic force generated by the second elastic element, the first and second structures are respectively movably engaged with the first and second elastic elements, the first elastic element and the second elastic element being thereby respectively substantially retained within the first position-limiting feature and the second position-limiting feature; and
   an operating member for operating the first locking mechanism and the second locking mechanism;
   wherein a first space is formed between the first and second elements responsive to the second element being at the first position;
   wherein the first space is adjusted to become a locking space larger than the first space responsive to the second element moving to the second position; and
   wherein the second elastic element is disposed substantially along a length of the slide rail.

* * * * *